April 17, 1951 P. L. SCHNEIDER ET AL Re. 23,359
ENGINE STARTER DRIVE
Original Filed Oct. 28, 1948 2 Sheets-Sheet 1
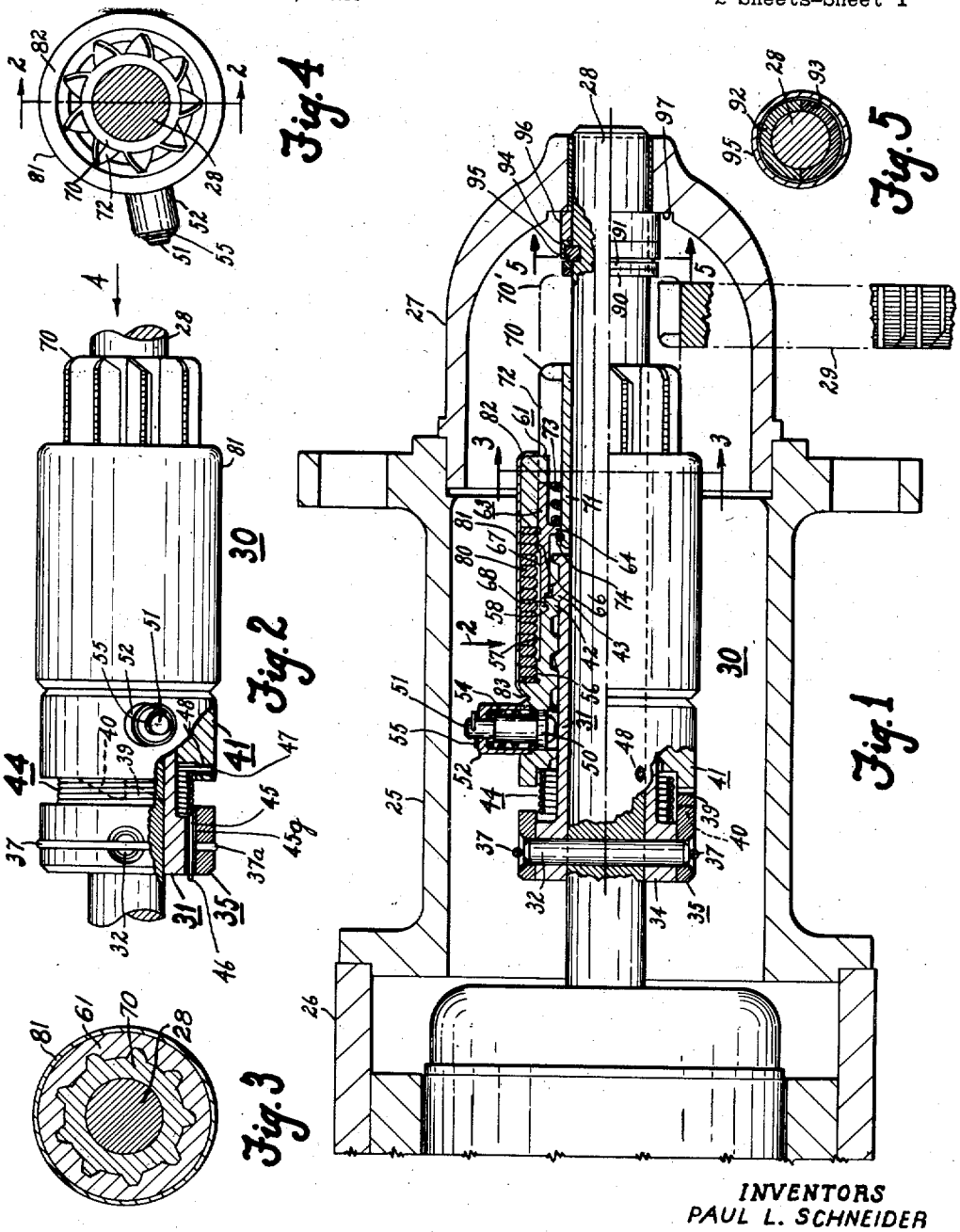
INVENTORS
PAUL L. SCHNEIDER
DENNIS W. NIGHBERT
BY HAROLD J. CROMWELL
Spencer Hardman and Fehr
THEIR ATTORNEYS April 17, 1951 P. L. SCHNEIDER ET AL Re. 23,359
ENGINE STARTER DRIVE
Original Filed Oct. 28, 1948 2 Sheets-Sheet 2
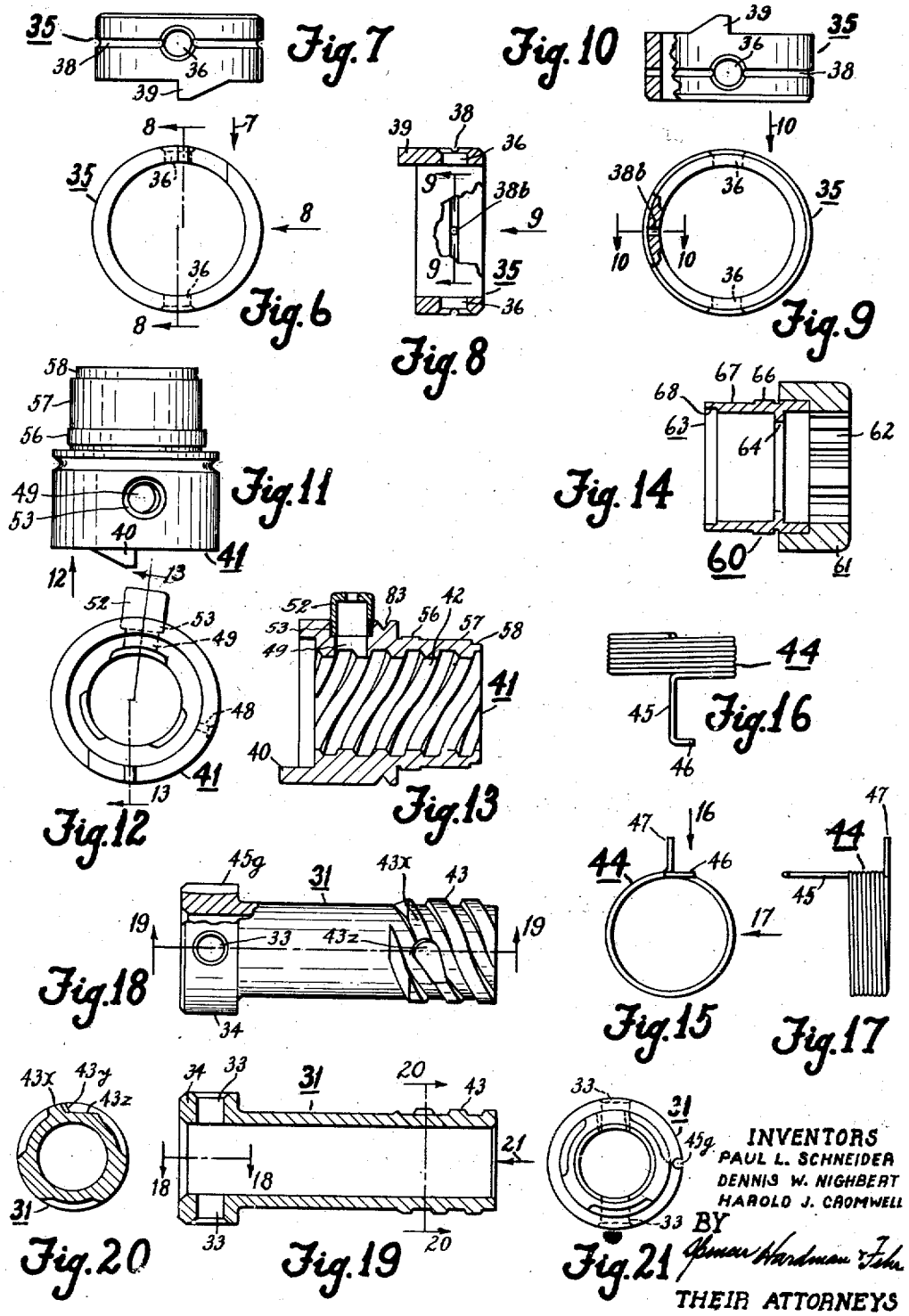
INVENTORS
PAUL L. SCHNEIDER
DENNIS W. NIGHBERT
HAROLD J. CROMWELL
BY
Pennie Hardman & Fish
THEIR ATTORNEYS Reissued Apr. 17, 1951 Re. 23,359

UNITED STATES PATENT OFFICE 23,359

ENGINE STARTER DRIVE

Paul L. Schneider, Dennis W. Nighbert, and Harold J. Cromwell, Anderson, Ind., assignors to General Motors Corporation, Detroit, Mich., a corporation of Delaware Original No. 2,509,110, dated May 23, 1950, Serial No. 57,054, October 28, 1948. Application for reissue September 1, 1950, Serial No. 182,694

2 Claims. (Cl. 74—7)

Matter enclosed in heavy brackets [ ] appears in the original patent but forms no part of this reissue specification; matter printed in italics indicates the additions made by reissue.

This invention relates to engine starter drives of the type wherein rotation of the starting motor shaft effects the meshing of the motor driven pinion with the engine flywheel gear and in which the pinion is automatically demeshed from the flywheel gear when the engine becomes self-operative.

An object of the invention is to prevent demeshment of the pinion in case of a false start, thereby eliminating the necessity for opening the starter switch and waiting for the starting motor to come to rest before repeating the starting operation.

Further objects and advantages of the present invention will be apparent from the following description, reference being had to the accompanying drawings, wherein a preferred embodiment of the present invention is clearly shown.

In the drawings:

Fig. 1 is a fragmentary, longitudinal, sectional view of a starting motor equipped with a starter drive or transmission embodying the present invention.

Fig. 2 is a view in the direction of arrow 2 and includes a fragmentary, longitudinal, sectional view of certain parts on line 2—2 of Fig. 4.

Fig. 3 is a sectional view on line 3—3 of Fig. 1.

Fig. 4 is a view in the direction of arrow 4 of Fig. 2.

Fig. 5 is a sectional view on line 5—5 of Fig. 1.

Fig. 6 is an end view of ring 35 shown in Fig. 1.

Fig. 7 is a view in the direction of arrow 7 of Fig. 6.

Fig. 8 is in part a view in the direction of arrow 8 in Fig. 6 and in part, a sectional view on line 8—8 of Fig. 6.

Fig. 9 is a view in the direction of arrow 9 of Fig. 8 and the part thereof in section is on the line 9—9 of Fig. 8.

Fig. 10 is in part a top view in the direction of arrow 10 of Fig. 9, and the part thereof in section is on line 10—10 of Fig. 9.

Fig. 11 is a top view of nut 41.

Fig. 12 is a view in the direction of arrow 12 of Fig. 11.

Fig. 13 is a sectional view on line 13—13 of Fig. 12.

Fig. 14 is a sectional view of an assembly of parts 61 and 63.

Fig. 15 is an end view of spring 44.

Figs. 16 and 17 are views taken respectively in the direction of arrows 16 and 17 of Fig. 15.

Fig. 18 is a plan view of screw sleeve 31, the part in section being on line 18—18 of Fig. 19.

Fig. 19 is a sectional view on line 19—19 of Fig. 18.

Fig. 20 is a sectional view on line 20—20 of Fig. 19.

Fig. 21 is a view in the direction of arrow 21 of Fig. 19.

In Fig. 1, a housing 25 which supports a motor field frame 26, is adapted to be attached to a flywheel gear housing and supports an extension 27 providing a bearing for one end of a shaft 28 whose other end is supported by an end frame, not shown, attached to the left end of frame 26. The flywheel gear housing encloses a flywheel gear 29 which is to be connected with motor shaft 28 by the starter drive 30 which comprises a screw sleeve 31 (Figs. 18 through 21), which is adapted to be supported by the shaft 28 and is secured thereto by pin 32 (Fig. 1) passing through holes 33 in the enlargement 34 at the left end of the sleeve. The enlargement 34 receives a ring 35 (Figs. 6 through 10) which has holes 36 for receiving the ends of pin 32 which is retained by a wire band 37 received by a groove 38 in ring 35 and having one end which is bent inwardly as shown as 37a (Fig. 2) and is received by hole 38b (Figs. 8 and 9). Ring 35 provides a stop lug 39 for engagement by a stop lug 40 provided by a nut 41 (Figs. 11–13) having internal helical threads 42 cooperating with the external helical threads 43 of sleeve 31. The nut 41 is normally retained in the position shown in Fig. 2 with its stop lug 40 engaging stop lug 39 of ring 35 by a spring 44 having an end portion 45 which is received by a groove 45g in the enlargement 34 of screw sleeve 31 and having a hook 46 engageable with the left face of sleeve 31 as shown in Fig. 2. The other end 47 of spring 44 is received by a hole 48 in nut 41, as shown in Fig. 2. The spring 44 operates as a torsion spring and as a tension spring to assist in returning the nut 41 to normal position.

Nut 41 provides a hole 49 for receiving a flange 50 of a plunger 51 enclosed by a cup 52 (Fig. 1), the lower edge of which is received by a counterbore 53 in nut 41 (Fig. 13); and the cup 52 encloses a spring 54 confined between the upper end of the cup and the flange 50 of plunger 51. Normally the plunger does not engage the sleeve 31 because it is prevented from doing so by a wire 55 which is passed through a hole in the upper end of the plunger and is bent around so as to rest upon the upper end of the cup. Nut 41 is provided with concentric cylindrical surfaces 56, 57 and 58.

The assembly 60 (Fig. 14) comprises a ring 61 having internal longitudinal splines 62 adapted to fit between the teeth 72 of a pinion 70 which is journaled on the shaft 28 (Fig. 1) and which has a tubular extension 71 which is received by an internal, annular flange 64 of a sleeve 63 which is permanently joined to the ring 61. Sleeve 63 is provided with a surface 68 which fits around the surface 58 of nut 41 and with a surface 67 of the same diameter as the surface 57 of nut 41, and with a surface 66 of the same diameter as the surface 56 of nut 41.

The nut 41 and the sleeve 63 are adapted to be coupled by a torque transmitting spring 80 which is retained endwise by a cover 81 having an internal flange 82 engaging the right end of the ring 61 and having its other end formed into a groove 83 provided by nut 41. The normal internal diameter of coils of spring 80 is slightly greater than the diameters of surfaces 57 and 67 and is slightly less than the diameters of the surfaces 56 and 66. Therefore, end turns of spring 80 grip the nut 41 and the sleeve 63.

The location of pinion 70 relative to the sleeve 63 is maintained normally by a spring 73 confined under compression between the left end faces of the teeth of pinion 70 and the flange 64 of sleeve 63 which the spring 73 urges against a wire split ring 74 snapped into a groove of the pinion extension 71.

Rotation of the shaft 28 in the proper direction effects, through the screw and nut connection, axial movement of the pinion 70 into position 70′ of full engagement with the flywheel gear 29 in which position the pinion engages a washer 90 bearing against a washer 91 and the latter engaging the left end faces of two half washers 92 and 93 received by an annular groove in shaft 28 and retained therein by a washer 94 having a flange 95 which surrounds the washers. A spacer 96 located between washer 94 and a finished surface 97 of the housing extension 27 retains the washer 94 in position for retaining washers 92 and 93. The thrust which washer 90 receives is transmitted through the washer 91 to the half washers 92 and 93 and to the shaft 28.

After the pinion has been moved by rotation of the shaft 28 into position 70′, the transmission of torque to the pinion for the purpose of cranking the engine begins to build up. Full torque is not applied immediately because the spring 80 must first constrict around the surfaces 57 and 67 respectively, of the nut 41 and the sleeve 63. This constriction of the spring 80 tends to cushion the shock of the torque transmission to the pinion because, as the spring 80 is constricted, the torque increases from a relatively low value to a value sufficient to cause the pinion to rotate the engine gear.

In case the end faces of the pinion teeth abut the end faces of the engine gear teeth before meshing, right movement of pinion 70 is momentarily arrested but the nut 41 and the sleeve 63 continue their right movement and additionally compress the spring 73 thereby preventing the rapid increase in pressure applied by the pinion teeth to the engine gear teeth that would occur if this yielding action were not used. This results in rotation of the pinion with respect to the engine gear when the relatively low torque required of spring 80 is developed whereupon, registration having been effected, the spring 73 will snap the pinion 70 into partial enmeshment with the flywheel gear and thereafter motion of the pinion 70 continues until it arrives at position 70′.

The starting motor cranks the engine; and, when the latter becomes self-operative and tends to drive the pinion faster than it can be driven by the starting motor, the pinion is automatically demeshed due to the nut and screw connections between it and the motor. This demeshing movement is assisted by the spring 44 and has been additionally stressed torsionally and tensionally when the pinion engages.

In case of a false start, meaning one in which the engine attempts to become self-operative but fails and stops, the pinion is not demeshed from the flywheel gear but continues to maintain the connection between the starting motor and the engine thereby avoiding the necessity of releasing the starter switch and waiting for the starting motor shaft to become stationary before repeating the starting operation. This feature is provided for by the plunger 51 carried by the nut 41. As the nut 41 is automatically threaded along the screw 31, the plunger 51 rides along one of the helical threads of the screw 31 indicated at 43x (Fig. 18) and drops in past abutment 43y and down upon a flat surface 43z (Fig. 20), thereby locking the nut 41 in a position corresponding to which the pinion occupies at position 70′. In case of a false start, the rotating speed attained by the nut 41 is insufficient to cause the plunger 51 to fly out by centrifugal force which is of such low value that it does not overcome the spring 54. Since there is no demeshment of the pinion, the car driver continues to maintain closure of the starter control switch until the engine becomes self-operative. A false start occurring particularly in cold weather, is usually characterized by the firing of part only of the engine cylinders. Each irregular explosion causes the engine to attempt to drive the pinion at a high speed. The driving torque which the engine applies to the pinion at irregular intervals is not transmitted to the nut 41 and from the nut to the screw 31 through the plunger 51 because the torque transmitting clutch slips and allows the pinion to overrun the nut when the engine applied torque tends to become excessive. Therefore the clutch serves to protect the plunger 51 and the engaged wall of the abutment 43y of the plunger receiving recess of screw 31 by preventing transmission of excessive torque from the pinion to the nut.

*The retraction by the action of centrifugal force of the detent plunger 51 from abutment 43y of a screw thread 43x (Fig. 20) is dependent upon the attainment of a certain speed of the motor armature shaft 28. The instant the engine becomes self-operative, the speed at which the pinion is driven by the engine initially will be of such value that the clutch will overrun due to the inertia of the motor armature shaft and parts directly connected therewith, including the motor armature, the screw sleeve 31 and the nut 41, and due to the limited capacity of the clutch to transmit torque in the reverse direction. Because the clutch overruns when the engine fires, torque is not immediately transmitted from the pinion 70 to the nut 41. Between the instant the engine fires and the instant the nut 41 attains a speed sufficient to effect retraction of plunger 51, there is an appreciable lapse of time during which the nut 41 is rapidly accelerated by the starting motor which has been relieved of the engine cranking load and which, under normal conditions, remains connected with a current source since the car driver is not apt to release the starter switch the instant the engine fires. As the motor armature shaft 28 is accelerated by torque produced by the starting motor, assist-*

*ed by the limited torque transmitted by the clutch when it overruns, the slippage of the clutch decreases and the speed of the screw sleeve 31 and nut 41 increases finally to a value such that centrifugal force acting on the plunger 51 overcomes the force of the spring 54 and the plunger 51 is retracted from the abutment 43y so that the pinion 72 will be demeshed from engine gear 92 by virtue of engine operation. If it happened that the starter switch were opened before the speed of nut 41 had reached a value such that detent plunger 51 is retracted, said speed value would eventually be attained by the limited torque transmitted by the clutch from the pinion to the nut.*

*Thus the clutch, which yieldingly transmits rotary motion between the nut 41 and the pinion 70 to overcome gear tooth abutment when required and to effect a gradual application of torque to effect engine cranking after the pinion is fully meshed with the engine gear 29 serves also to protect the plunger 51 from damage either in case of a false start or at the instant of actual self-operation of the engine by preventing instantaneous transmission of torque from the pinion 70 to the nut 41; and, because this clutch initially overruns, time is provided for acceleration of nut 41 by torque developed by the starting motor and the overrunning clutch, or by the overrunning torque of the clutch alone. Regardless of the speed of the pinion when driven by the operative engine, the speed of the armature when the detent plunger is retracted is always the same.*

[The instant the engine becomes self-operative, the engine-applied torque may initially be of such value that the clutch will slip; but, as pinion speed increases, during further operation of the engine, slippage of the clutch decreases and the nut is driven by the pinion for an instant at such speed that the centrifugal force acting on plunger 51 is sufficient to overcome the spring 54 so that the plunger end moves above surface 43z and abutment 43y, thereby permitting demeshment of the pinion.

Thus the clutch, which yieldingly transmits rotary motion between the nut 51 and the pinion 70 to overcome gear tooth abutment when required and to effect a gradual application of torque to effect engine cranking after the pinion is fully meshed with the engine gear 29, serves also to limit the transmission of engine applied torque to the nut at the instant of firing thereby protecting the plunger 51 from damage either in case of a false start or at the beginning of actual self-operation of the engine.]

While the embodiment of the present invention as herein disclosed, constitutes a preferred form, it is to be understood that other forms might be adopted.

What is claimed is as follows:

1. An engine starter drive comprising a tubular screw shaft adapted to be mounted on a starting motor shaft and to be connected therewith, a pinion movable axially along the motor shaft into mesh with an engine gear, a nut threadedly connected with the screw shaft, means for yieldingly transmitting rotary motion from the nut to the pinion, means for yieldingly transmitting motion axially from the nut to the pinion in the direction to mesh the pinion with the engine gear, means for nonyieldingly transmitting motion from the nut to the pinion in the direction to retract the pinion from the engine gear, stops provided respectively by the screw shaft and the nut which are engaged upon rotation of the nut in the direction to retract the pinion, a light helical torsion spring surrounding the screw shaft and connected with the nut and screw shaft for retaining the stop of the nut normally in engagement with the stop of the screw shaft whereby the pinion is located a definite distance from the engine gear, said screw shaft having a non-threaded portion of diameter less than the outside diameter of the screw threads between its threaded portion and its stop, a latching plunger guided by the nut for movement transversely thereof, a spring opposing movement of the plunger by centrifugal force, said plunger being located on the nut for movement by the nut from a normal position adjacent the non-threaded portion of the screw shaft to a position engaging a thread of the screw shaft only after the pinion has partially meshed with the engine gear, said thread of the screw shaft having a recess for receiving the plunger after further meshing of the pinion, said second spring urging the plunger into said recess, and means preventing engagement of the plunger with the non-threaded portion of the screw shaft.

2. An engine starter drive comprising a screw-shaft connectible with a starting motor shaft and having a non-threaded portion of diameter less than the outside diameter of the screw threads, a nut threaded on the screw shaft and having a transverse hole the inner end of which aligns with the non-threaded portion of the screw shaft in the normal position of the nut, a latching plunger received by said hole, a spring surrounding the plunger and urging it toward the screw shaft, a spring retainer attached to the nut and enclosing the spring and providing an opening through which the outer end of the plunger extends, a pin secured to the outer end of the plunger to engage the retainer to prevent movement by the spring of the inner end of the plunger against the non-threaded portion of the screw shaft, the hole in the nut being so located that the inner end of the plunger will engage the outer surface of a thread of the screw shaft as the nut is threaded therealong, a pinion movable axially along the motor shaft into mesh with an engine gear, means for yieldingly transmitting motion axially between the nut and pinion, means for yieldingly transmitting rotary motion between the nut and pinion, the thread engaged by the plunger having a recess which receives the inner end of the member when the nut has moved along the screw shaft into a position for effecting meshing of the pinion with the engine gear, said recess providing an abutment engaged by said member to prevent pinion-demeshing movement of the nut until a predetermined rotation speed thereof has been attained.

PAUL L. SCHNEIDER.
DENNIS W. NIGHBERT.
HAROLD J. CROMWELL.

REFERENCES CITED

The following references are of record in the file of this patent or the original patent:

UNITED STATES PATENTS

| Number | Name | Date |
|---|---|---|
| 2,344,463 | Janes | Mar. 14, 1944 |
| 2,345,791 | Buxton | Apr. 4, 1944 |